May 19, 1964     A. D. SLATKIN     3,133,828
PROCESS AND APPARATUS FOR POLYMERIZED SURFACE COATING
Original Filed July 11, 1958
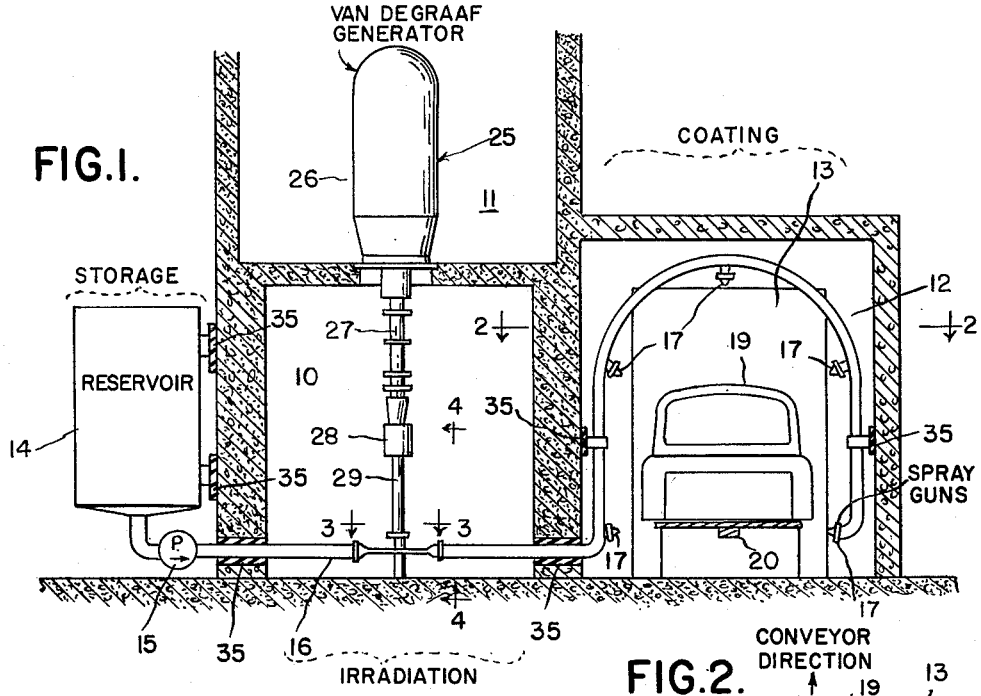
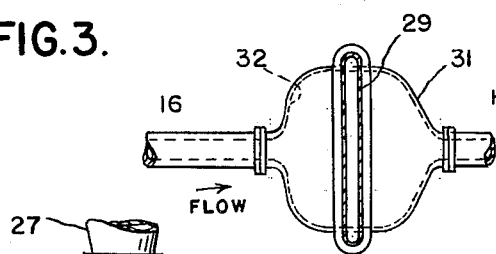
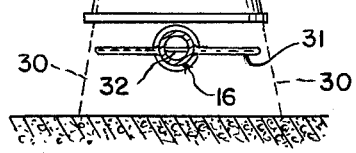
INVENTOR.
ALFRED D. SLATKIN
BY
ATTORNEYS United States Patent Office 3,133,828
Patented May 19, 1964

3,133,828
PROCESS AND APPARATUS FOR POLYMERIZED SURFACE COATING
Alfred D. Slatkin, 114 E. Hickory Grove, Bloomfield Hills, Mich.
Continuation of application Ser. No. 748,050, July 11, 1958. This application Dec. 13, 1961, Ser. No. 160,410
15 Claims. (Cl. 117—93.31)

This is a continuation of my copending application Serial No. 748,050, filed July 11, 1958, now abandoned.

My invention relates to a process for finish coating an article with a polymer material and to an apparatus therefor, and more particularly to a process and apparatus for effecting polymerization of a finish coating by the use of radiation preferably produced by high energy particle accelerators.

Heretofore research in the use of radiation or high energy particle acceleration in effecting the ionization necessary to initiate polymerization of various materials has been generally limited to the creation of polymers in bulk for subsequent molding and use, or to the treating of preformed products, and no particular success has been achieved. In many industries, although the superior qualities of polymer surface coatings are recognized, many difficulties have arisen in attempting to provide a commercially feasible and effective method of using radiation or high energy particle acceleration for producing polymer coatings. The automobile industry, for example, has sought such a method for producing automobile finishes of the high hardness, gloss, flexibility and elongation desired.

An object of the present invention is to improve the art of applying finish coatings by providing a simplified process and apparatus for initiating polymerization of coating materials by means of radiation such as high energy accelerated particles.

Another object of the present invention is to produce a superior finish coating by providing a new process and apparatus for polymerization of the usual solvent, polymerizable resin base paint initiated by the induced ionization of radiation preferably through high energy particle acceleration.

A further object of the invention is to effect a practical commercial utilization of high energy particle accelerators by providing a simplified process and apparatus for initiating polymerization in finish coating materials.

Yet another object of the invention is to improve finish coating by inducing ionization in a thinned polymerizable material and delaying the polymerization thereof until after the material is applied.

For a more complete understanding of the present invention, reference may be had to the accompanying drawing illustrative of a preferred embodiment of an apparatus employing the inventive process in which like reference characters refer to like parts throughout the several views and in which FIG. 1 is a cross-sectional view of a preferred structure incorporating an apparatus utilizing the present process.

FIG. 2 is a cross-sectional view taken substantially on the line 2—2 of FIG. 1.

FIG. 3 is a cross-sectional view of a portion of the preferred apparatus utilized in the present process and taken substantially on the line 3—3 of FIG. 1, and FIG. 4 is a cross sectional view of the apparatus taken substantially on the line 4—4 of FIG. 1.

The apparatus as presently illustrated in one preferred form is applicable to the painting of automobile bodies but is obviously not limited to this use. A concrete building is illustrated as comprising a radiation room 10, and accelerator area 11, a paint booth 12, and a heat room 13.

The apparatus here used comprises a paint reservoir 14 preferably disposed exteriorly of the aforesaid rooms, a pump 15, and a pipe or conduit 16 which extends through the radiation room 10 into the paint booth 12, preferably terminating in a plurality of paint spray nozzles 17.

Banks of heat lamps 18 or other suitable heating means may be installed in the room 13 as shown in FIG. 2. The articles to be coated, in the present case automobile bodies 19, are preferably moved through the paint booth 12 and heat room 13 by means of a conveyor chain 20 or other suitable means.

The radiation source preferred in the present process is a Van de Graaff generator 25 of conventional construction comprising an electrostatic belt generator 26 and an accelerating tube 27 terminating in a magnetic scanner 28, the resulting scanning beam of highly accelerated electron particles passing through a fan-shaped tube 29 to emerge as indicated by the dotted lines 30 in FIG. 4 closely adajacent a broad flat pipe portion 31 of the pipe 16. It will be apparent that other sources of radiation, such as low frequency resonance transformers, may also be used.

The pipe section 31 is preferably constructed with a thin passage 32 having substantially the same total cross-sectional area as the other portions of the pipe 16, and being disposed in a horizontal plane substantially normal to the beam of electrons from the generator 25, the beam being scanned in a plane disposed substantially normal to the direction of fluid flow through the passage 32.

The power of the radiation source and the thickness of the passage 32 are chosen such that the electron beam completely penetrates the passage 32 to produce sufficient ionization in the fluid passing therethrough, with respect to the rate of flow, density, and nature of the fluid, to accomplish the purpose intended.

In the presently illustrated embodiment of the process, a two mev. generator 25 will be found sufficiently effective for providing a radiation dosage of about two million rads in a standard thinned automobile enamel with an alkyd melamine urea base. It will be apparent that different paints will require different radiation dosages.

A paint which has been found to be satisfactory is a particular black enamel which has the following composition:

| Solids, 48%: | Percent | |
|---|---|---|
| Pigment-carbon black | 5.5 | |
| Melamine formaldehyde | 14.5 | 20 |
| Alkyd resin: | | |
| Phthalic anhydride | 38.0 | |
| Soya oil acids | 36.0 | |
| Glycerine | 26.0 | 80 |
| | | 100 |
| Volatile portion, 52%: | | |
| Aromatic hydrocarbons | | 90 |
| Alcohol | | 10 |
| | | 100 |

However, it is to be emphasized that many other paints and polymerizable substances will work equally as satisfactorily with this process as the black enamel described above. The invention is not intended to be limited to this particular enamel.

The process as here conceived is predicated on the discovery that the properly chosen radiation dosage will produce in the surface coating material sufficient ionization to produce a polymerization thereof. However, the separation of the molecules of polymerizable material due to the thinner is such that cross-linkage cannot occur within the pipe 16, and the radiation-induced energy of ionization is retained for an ascertainable period of time. The irradiated thinned material is conducted by the pipe 16 directly and immediately to the spray nozzles 17 which apply a thin coating to the surface of the automobile body 19 or other article which is being preferably rapidly conveyed through the paint booth 12. The body 19 immediately is carried through the heat room 13 in which the heating lamps 18 or other means quickly substantially flashes off the thinner. Due to the retained energy previously described, when the molecules of polymerizable material are brought closer together by the elimination of most of the thinner, cross-linkage effects complete polymerization of the coating regardless of its location on the article so that a fully uniform superior polymerized surface coating is provided even in those inaccessible crevices into which the coating material may have flowed. The elapsed time between irradiation and final flashing off of thinner is an important factor in this process since leaking off of the induced energy can not be completely prevented. It is found that the aforesaid elapsed time should not exceed about 20 minutes in the present process.

It is also noted that suitable electrical insulation such as shown at 35 in FIGS. 1 and 2 is required to prevent rapid energy dissipation through the components of the system.

It is not necessary to provide the automobile bodies 19 or the conveyor 20 with similar insulation, since the rapid evaporation of the solvents in the paint on spraying instantly initiates at least some polymerization and thus minimizes energy losses due to leakage at this point. A large portion of the solvent has evaporated during the time the paint travels from the spray nozzles 17 to the surface of the automobile bodies 19. Polymerization begins almost simultaneously upon contact of the paint and the surface to be sprayed. The automobile 19 is then soon moved to the heat room 13 where the rest of the solvent is flashed off, thus completing polymerization of the material, because the ionized molecules are then in closer proximity to permit of effective cross-linkage without permitting significant amounts of the energy to escape through the uninsulated bodies 19.

The use of the insulation 35 between the supply equipment and the ground, however, is a vital factor in ensuring that full use of the "memory" effect, i.e., retention of energy, is made. Without insulation, a constant ground is present which would leak off the energy before the material reached the nozzles.

It will be apparent that many other factors are essential to the effectiveness of the present process, the end product being dependent for example on the energy absorption efficiency of whatever finish material is used, the density and viscosity of the material, the effective depth of maximum penetration of radiation, the acceleration and quantity of radiation particles, the rate of flow through the beam of radiation, the dimensions of the passage 32, the proportion of thinner to polymerizable material, the effectiveness of electrical insulation, and the effect of any included pigments or other materials which may shield the polymerizable material from radiation.

Many advantages in the present system will be readily apparent, such as eliminating the high cost and time of the oven baking cycle which now exists and the production of a thorough and extremely durable, resistant finish or surface coating of far superior qualities than presently may be obtained, and the elimination of the use of chemical catalysts for polymerization which are often difficult to control and unpredictable in results.

Other advantages of irradiation produced polymerization over conventional baking systems utilizing heat for polymerization are also well recognized. The present polymer, for example, contains no catalyst fragments or foreign substances and therefore has a higher degree of purity. Since the present process operates at relatively low temperatures, adverse thermal effects are avoided. Moreover, molecular weight control by temperature changes may be readily achieved over a wide range since the irradiation is effective in polymerizing certain monomers which show little or no tendency to polymerize thermally, opening the field of finish coating to a wider variant of materials.

Although I have described only one preferred embodiment of my invention, it will be apparent to one skilled in the art to which the present process pertains that various modifications and changes may be made therein without departing from the spirit of the invention and the scope of the appended claims.

I claim:
1. A process of finish coating an article comprising the steps of
   (a) subjecting to high energy irradiation a solution of a polymerizable coating material and a volatile thinner, in which the material and energy are of types such that the irradiation will excite the molecules of material to a state capable of polymerizing the material upon subsequent removal of thinner, and in which the concentration of coating material in the thinner is low enough to separate the excited molecules of the material sufficiently to prevent polymerization from taking place until subsequent removal of thinner,
   (b) transporting the irradiated solution into proximity with said article,
   (c) electrically isolating said solution from ground and from said article during the steps of irradiation and transportation, thereby preventing premature dissipation of energy from said material,
   (d) coating said article with said solution within such time following irradiation that useful energy in said material has not had an opportunity to leak off, and
   (e) flashing off said thinner shortly thereafter whereby polymerization of said material occurs when the molecules thereof are brought closer together on evaporation of said thinner.

2. The process as defined in claim 1 and in which excitation of said material is effected by projecting a substantially fan shaped beam of high energy radiation into a working area and moving a stream of material through said area and in a direction substantially normal to the plane of said beam.

3. The process as defined in claim 1 and in which excitation of said material is effected by irradiating said solution with a beam of high energy accelerated particles.

4. The process as defined in claim 1 and in which excitation of said material is effected by irradiating said solution with a beam of high energy accelerated electron particles.

5. The process as defined in claim 1 and in which the chosen radiation dosage and the elapsed time between irradiation of said solution and flashing off of said thinner is such that sufficient energy is retained in the remaining material to effect optimum polymerization thereof.

6. The process as defined in claim 5 and in which the radiation dosage is approximately one million rads.

7. The process as defined in claim 5 and in which the aforesaid elapsed time is less than twenty minutes.

8. An apparatus for finish coating an article and comprising a source of a solution of polymerizable material and thinner, a source of radiation operable to irradiate said solution to effect ionization of said thinned material, means transporting said irradiated solution into proximity with said article, means electrically insulating said source of polymerizable material and said transporting means from the ground, means applying the irradiated solution to said article, and means flashing off the thinner from the coated article to produce polymerization of said material due to the energy of ionization retained by said material.

9. The apparatus as defined in claim 8 and in which said source of radiation comprises a high energy particle accelerator producing a beam of radiation.

10. The apparatus as defined in claim 9 and having a conducting means for conducting said solution through said beam of radiation and constructed to permit complete penetration of said solution by the accelerated particles.

11. The apparatus as defined in claim 10 and in which said conducting means includes a substantially thin broad fluid passage disposed in a plane substantially normal to the aforesaid beam of radiation.

12. The apparatus as defined in claim 11 and in which said accelerator has means scanning said beam of radiation in a plane disposed substantially normal to the direction of flow of said solution through said passage.

13. The apparatus as defined in claim 8 and in which said applying means is disposed substantially close to said source of radiation and is operable to apply said solution to said article substantially soon subsequent to irradiation of said solution.

14. The apparatus as defined in claim 13 and in which said means flashing off the thinner is disposed substantially close to said applying means, means transporting the coated article to said means flashing off the thinner substantially soon subsequent to application of said irradiated solution such that said thinner is substantially evaporated before substantial dissipation of energy from said ionized material has occurred.

15. The apparatus as defined in claim 8 and in which said last mentioned means comprises a source of heat operable to rapidly flash off the substantially major part of said thinner.

References Cited in the file of this patent

UNITED STATES PATENTS

| | | |
|---|---|---|
| 1,818,073 | Long | Aug. 11, 1931 |
| 2,413,973 | Howk et al. | Jan. 7, 1947 |
| 2,429,217 | Brasch | Oct. 21, 1947 |
| 2,431,629 | Wind et al. | Nov. 25, 1947 |
| 2,670,483 | Brophy | Mar. 2, 1954 |
| 2,746,883 | Powers | May 22, 1956 |
| 2,793,970 | Jeppson | May 28, 1957 |
| 2,908,590 | Norris | Oct. 13, 1959 |
| 2,921,006 | Schmitz et al. | Jan. 12, 1960 |
| 3,024,132 | Mathues | Mar. 6, 1962 |
| 3,043,760 | Burklin et al. | July 10, 1962 |
| 3,056,735 | Smith-Johannsen | Oct. 2, 1962 |

FOREIGN PATENTS

| | | |
|---|---|---|
| 566,064 | Great Britain | Dec. 12, 1944 |
| 835,121 | Great Britain | May 18, 1960 |